US012768680B2

(12) United States Patent
Chen et al.

(10) Patent No.: US 12,768,680 B2
(45) Date of Patent: Oct. 20, 2026

(54) HIGH RESOLUTION 2D INDOOR LOCALIZATION WITH FIBER OPTIC SENSOR

(71) Applicant: NEC Laboratories America, Inc., Princeton, NJ (US)

(72) Inventors: Yueheng Chen, South Brunswick, NJ (US); Ming-Fang Huang, Princeton, NJ (US)

(73) Assignee: NEC Corporation (JP)

( * ) Notice: Subject to any disclaimer, the term of this patent is extended or adjusted under 35 U.S.C. 154(b) by 338 days.

(21) Appl. No.: 18/319,469

(22) Filed: May 17, 2023

(65) Prior Publication Data

US 2023/0375376 A1 Nov. 23, 2023

Related U.S. Application Data

(60) Provisional application No. 63/344,074, filed on May 20, 2022.

(51) Int. Cl.

*G01D 5/353* (2006.01)
*G01C 21/20* (2006.01)
*G01H 9/00* (2006.01)

(52) U.S. Cl.

CPC ....... *G01D 5/35358* (2013.01); *G01C 21/206* (2013.01); *G01H 9/004* (2013.01)

(58) Field of Classification Search

CPC ... G01D 5/35358; G01H 9/004; G01C 21/206
See application file for complete search history.

(56) References Cited

U.S. PATENT DOCUMENTS 5,355,208 A * 10/1994 Crawford ............. G08B 13/186 356/35.5
2006/0077172 A1* 4/2006 Fukumoto .............. H04B 13/00 345/156
2006/0261259 A1* 11/2006 Beinhocker ............... G01J 1/42 250/227.15

(Continued)

FOREIGN PATENT DOCUMENTS

CN 211836262 U * 11/2020
CN 109084768 B * 11/2021 ........... G01C 21/206

(Continued)

OTHER PUBLICATIONS

Translation of CN109084768.*
Translation of CN211836262.*

*Primary Examiner* — Helen C Kwok
(74) *Attorney, Agent, or Firm* — Vincent Duffy

(57) ABSTRACT

A distributed fiber optic sensing (DFOS) system including a smart-mat that: 1) identifies indoor locations of moving persons/objects; 2) provides a 2D visual mapping; and 3) covers any blind spots with supplemental technologies including LiDAR, RF radar, etc. The DFOS system with smart-mat may be deployed virtually anywhere indoors and may even be constructed to replace carpeting. When our inventive DFOS system and smart-mat is deployed throughout an entire building, building safety and security is greatly improved by providing up-to-date localization information of building occupants while eliminating blind zones and reducing maintenance costs.

10 Claims, 12 Drawing Sheets

(56) References Cited

U.S. PATENT DOCUMENTS

| | | | | |
|---|---|---|---|---|
| 2007/0037462 | A1* | 2/2007 | Allen | G01M 11/086 442/5 |
| 2008/0144992 | A1* | 6/2008 | Thompson | A61B 5/6892 385/13 |
| 2008/0227349 | A1* | 9/2008 | Eyck | A61B 5/015 374/E11.016 |
| 2012/0173171 | A1* | 7/2012 | Bajwa | G08G 1/015 702/56 |
| 2014/0151147 | A1* | 6/2014 | Lupton | G01V 8/16 250/227.14 |
| 2014/0362668 | A1* | 12/2014 | Mcewen-King | B61L 23/06 367/118 |
| 2016/0275788 | A1* | 9/2016 | Wu | G08G 1/02 |
| 2017/0031084 | A1* | 2/2017 | Lee | G02B 5/02 |
| 2017/0248462 | A1* | 8/2017 | Farhadiroushan | G01H 9/004 |
| 2018/0342156 | A1* | 11/2018 | Martin | G08G 1/052 |
| 2018/0356210 | A1* | 12/2018 | Moore | G01B 11/18 |
| 2020/0172130 | A1* | 6/2020 | Esprey | B61L 25/025 |
| 2020/0401784 | A1* | 12/2020 | Salemi | G06F 18/243 |
| 2021/0312801 | A1* | 10/2021 | Ji | G06T 5/94 |
| 2022/0172479 | A1* | 6/2022 | Yoda | G06V 40/23 |
| 2025/0248676 | A1* | 8/2025 | Gemmel | G05D 1/646 |

FOREIGN PATENT DOCUMENTS

| | | | | |
|---|---|---|---|---|
| EP | 2803950 | A1 * | 11/2014 | G01D 5/353 |
| GB | 2505424 | A * | 3/2014 | G01D 5/35345 |
| GB | 2529674 | A * | 3/2016 | G01D 5/35358 |

* cited by examiner

HIGH RESOLUTION 2D INDOOR LOCALIZATION WITH FIBER OPTIC SENSOR

CROSS-REFERENCE TO RELATED APPLICATIONS

This application claims the benefit of U.S. Provisional Patent Application Ser. No. 63/344,074 filed May 20, 2022, the entire contents which is incorporated by reference as if set forth at length herein.

FIELD OF THE INVENTION

This application relates generally to distributed fiber optic sensing (DFOS) systems, methods, and structures. More particularly, it pertains to high resolution 2D indoor localization with fiber optic sensor.

BACKGROUND OF THE INVENTION

Indoor localization of persons and objects has become increasingly important as such localization is critical for both occupant safety and utility infrastructure operation. A common contemporary approach to indoor localization may utilize cameras, or RFID tags. As is known, cameras create privacy concerns, and RFID technologies require numerous sensors strategically placed. Other technologies such as GPS, RF radar, LiDAR likewise present numerous operational difficulties.

SUMMARY OF THE INVENTION

An advance in the art is made according to aspects of the present disclosure directed to a distributed fiber optic sensing (DFOS) system including a smart-mat that: 1) identifies indoor locations of moving persons/objects; 2) provides a 2D visual mapping; and 3) covers any blind spots with supplemental technologies including LiDAR, RF radar, etc.

In sharp contrast to the prior art, our DFOS system with smart-mat may be deployed virtually anywhere indoors and may even constructed to replace carpeting. When our inventive DFOS system and smart-mat is deployed throughout an entire building, building safety and security greatly improves by eliminating blind zones while reducing maintenance costs.

DETAILED DESCRIPTION OF THE INVENTION

Figure 1A:
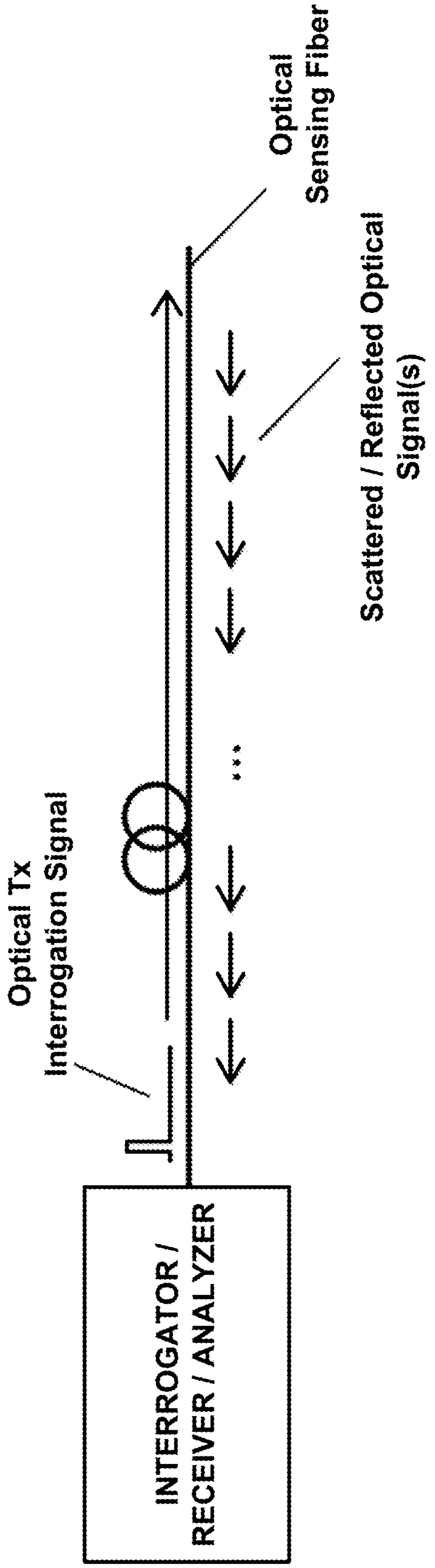
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect opto-electronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
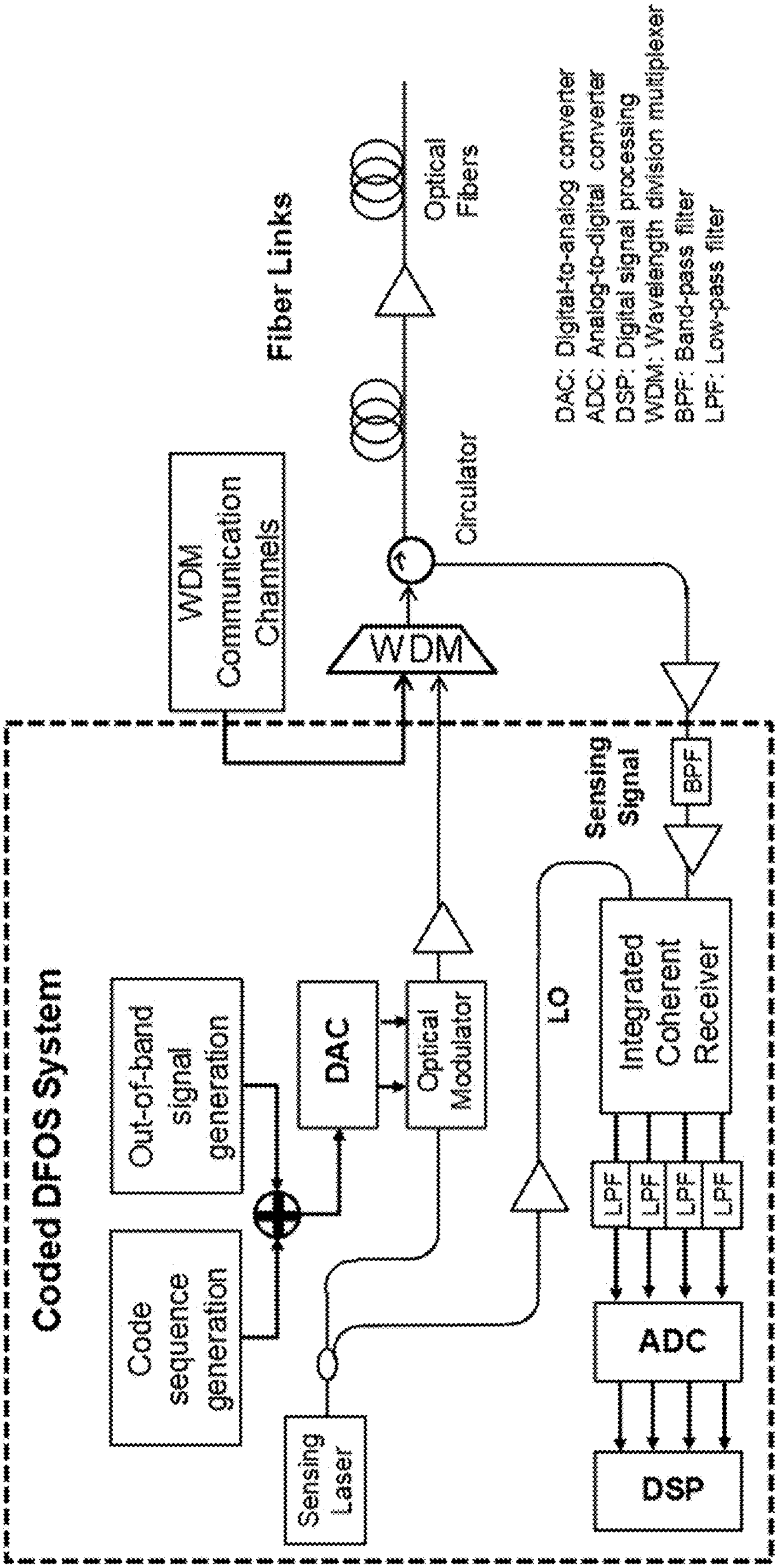

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

Figure 2:
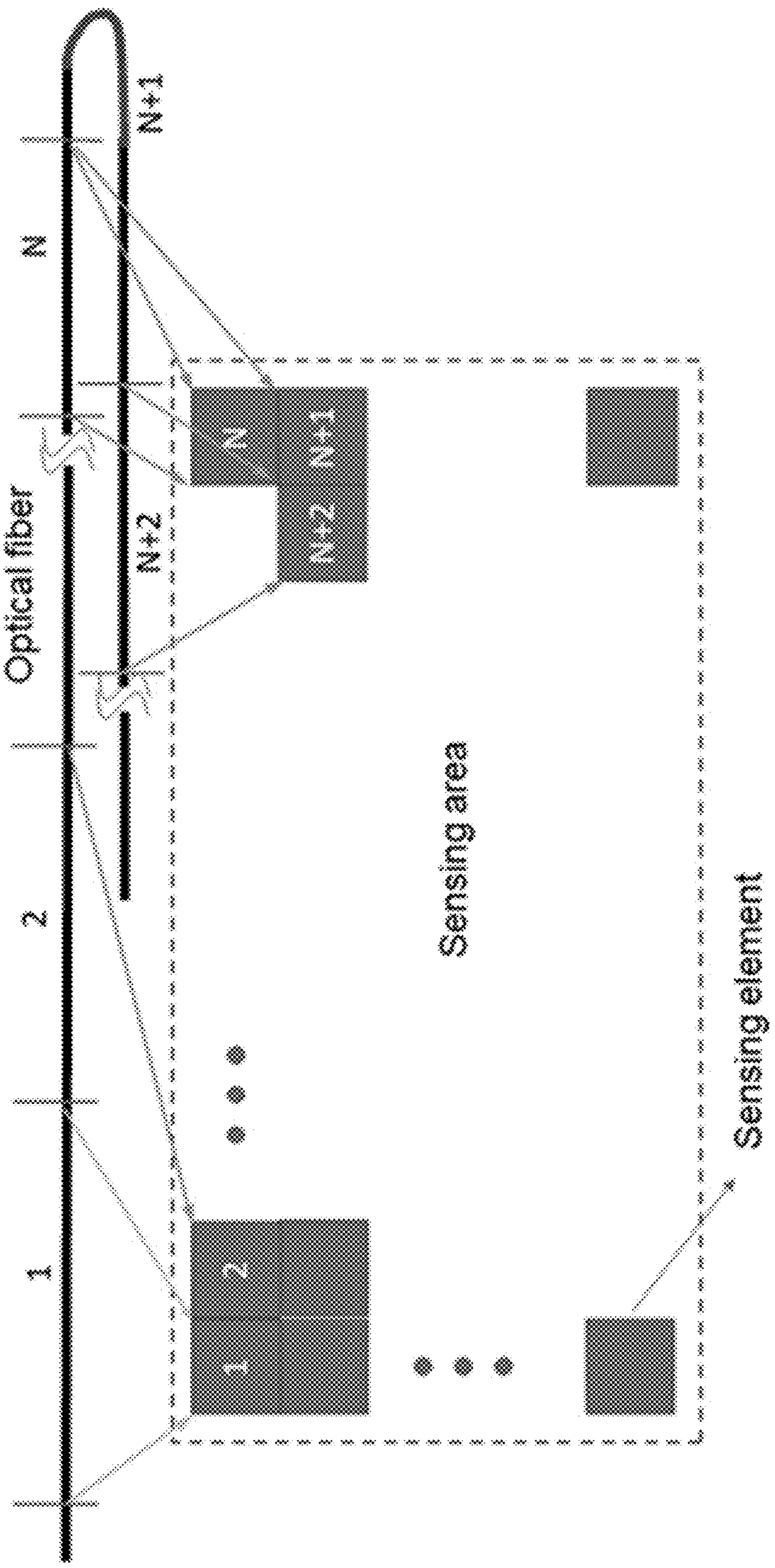
FIG. 2. Is a schematic diagram showing an illustrative mapping a linear optical fiber to a 2D element array according to aspects of the present disclosure.

FIG. 2. Is a schematic diagram showing an illustrative mapping a linear optical fiber to a 2D element array according to aspects of the present disclosure, With reference to that figure, we note that in order overcome a limited spatial resolution of straight optical fiber using the DFOS system, we divide a sensing area into multiple square (or other shaped) elements, for example 6 inches×6 inches, and evenly distribute the fiber section to occupy each element as shown in the figure. The length of each section will be the same as the spatial resolution of the DFOS system. In such a way, a one-dimensional linear sensing array can be converted to two-dimensional sensing elements.

Figure 3:
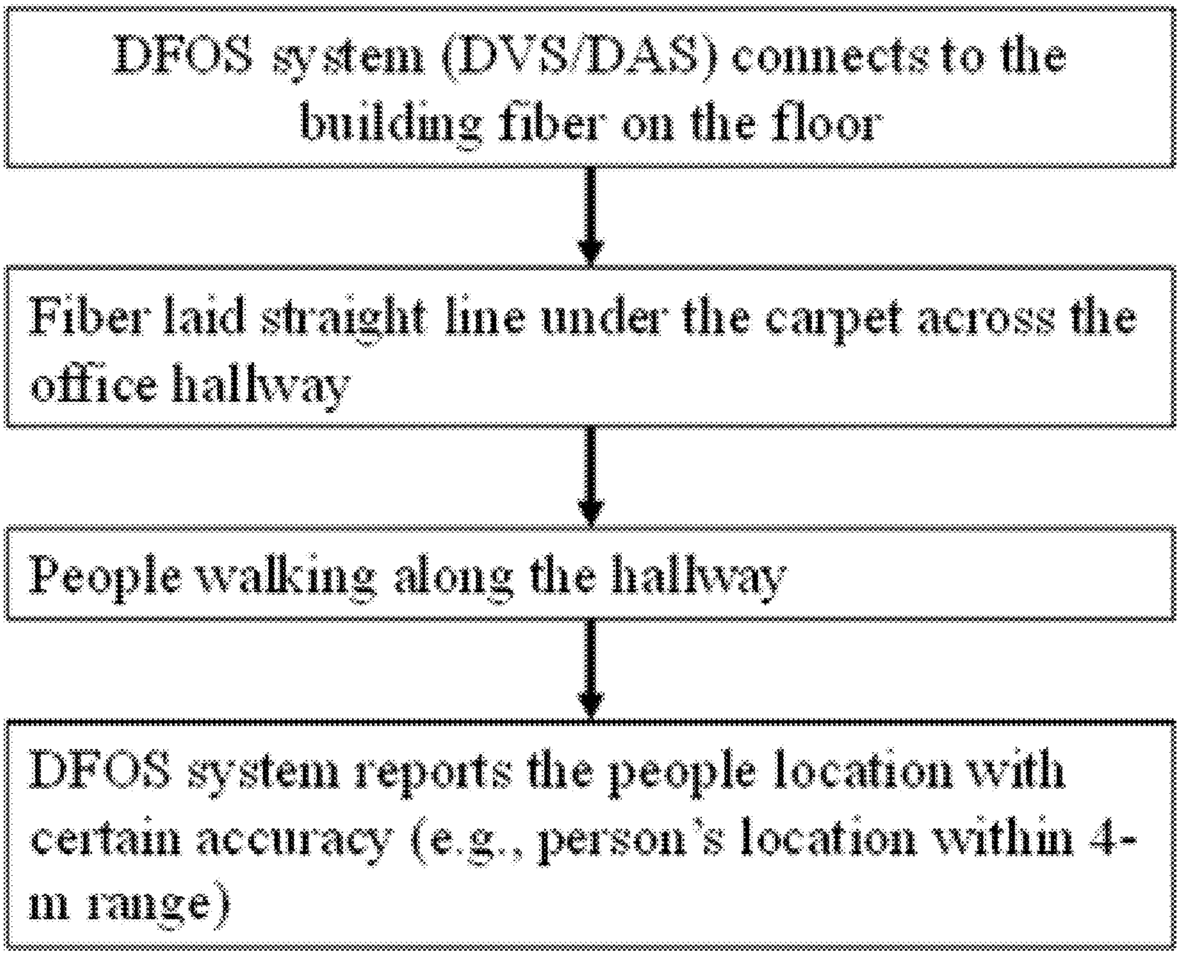
FIG. 3 is a schematic flow diagram showing illustrative workflow of existing indoor localization method using DFOS system according to aspects of the present disclosure.

FIG. 3 is a schematic flow diagram showing illustrative workflow of existing indoor localization method using DFOS system according to aspects of the present disclosure. We note that such a method as illustratively shown in this figure exhibits several problems. More particularly:

Non-Precise Localization

The DFOS system detects vibration resulting from people walking. When people walk on a carpet, the tile of the carpet or floor will vibrate together. Using a straight-line optical fiber under the carpet to detect human walking positions, the spatial resolution would be limited to provide the precise localization.

Unknown Perpendicular Distance

The straight-line optical fiber receives all vibrations close to the cable but cannot determine their perpendicular distance to the fiber.

Inaccurate of Parallel Walking Detection

Since the 1-dimensional localization only report vibrations occurring along the fiber, it is difficult to recognize two people if they walk in parallel paths. However, this is a usual case in the office building as people oftentimes walk in parallel while chatting to one other.

Figure 4:
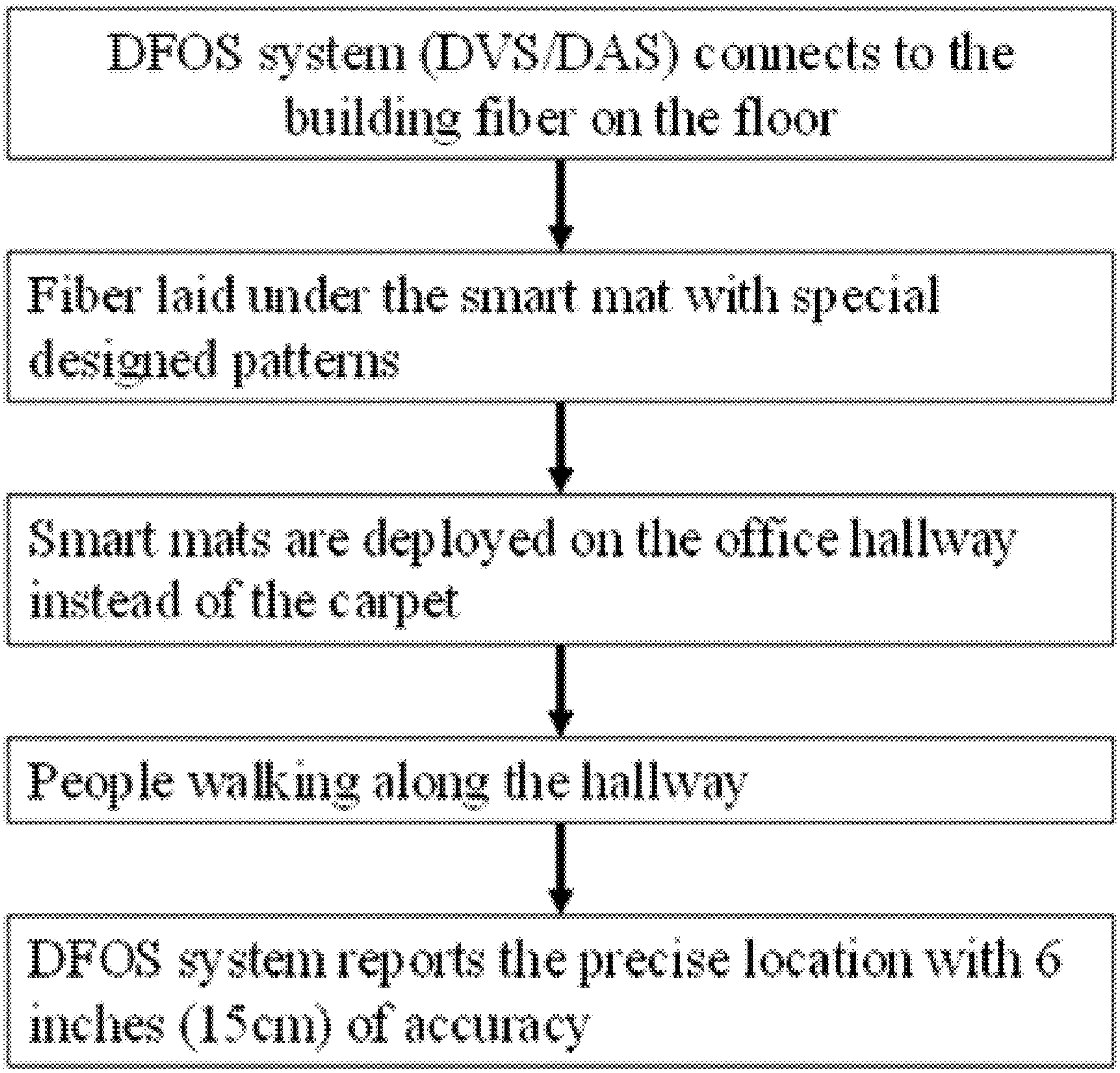
FIG. 4 is a schematic flow diagram showing illustrative workflow of indoor 2D localization using DFOS according to aspects of the present disclosure.

FIG. 4 is a schematic flow diagram showing illustrative workflow of indoor 2D localization using DFOS according to aspects of the present disclosure. As shown in that figure, a DFOS system such as a distributed vibrational system (DVS) or distributed acoustic sensing (DAS) system is interconnected with building fiber located on/in the floor. Fiber is laid with a smart mat with special designed patterns. Smart mats are deployed in the hallways, and other locations, instead of carpeting. When people walk along the locations including the smart-mats, the DFOS system will detect the persons and report the precise location within 6 inches (15 cm) of accuracy.

Figure 5:
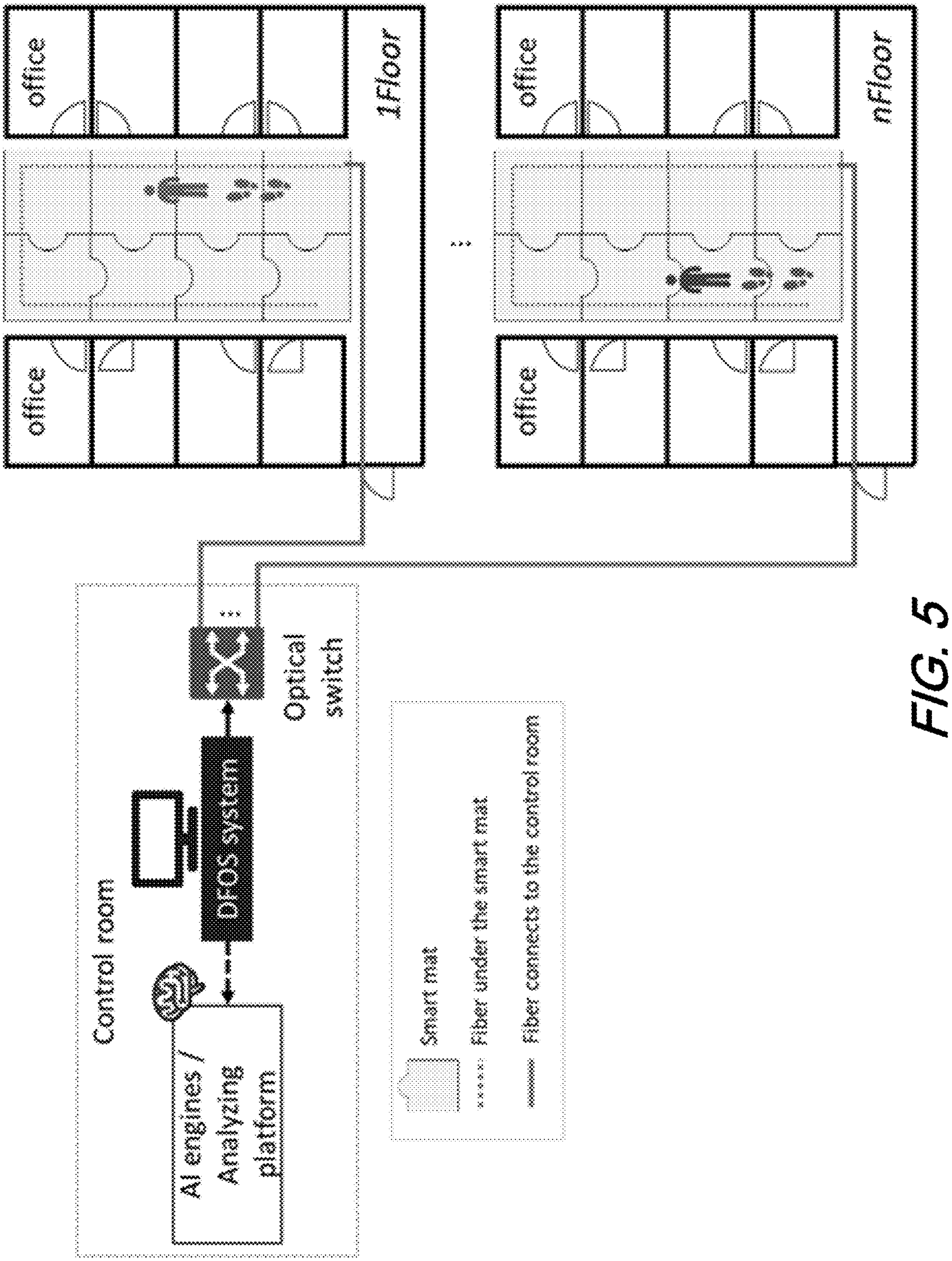
FIG. 5 is a schematic diagram showing illustrative system setup according to aspects of the present disclosure.

FIG. 5 is a schematic diagram showing illustrative system setup and architecture according to aspects of the present disclosure. The distributed fiber optic sensing system (DFOS) which can be distributed acoustic sensing (DAS) and/or distributed vibration sensing (DVS) may be located in a control room for centralized monitoring of an entire building. The DFOS system is integrated with an optical switch and connected to the floor fibers to provide localization functions on multiple floors.

The design of the fiber-based smart mat is specifically designed to conveniently sense a large area. It is straight forward to convert one-dimensional linear sensing array to two dimensional elements by zig-zag way show in the figure. However, the main issue is to improve the actual spatial resolution of sensing area. To 'squeeze' the lengthy thread of optical fiber to a finer grid, we arrange the optical fiber to several special spiral pattern. We denote it as spiral fiber sensing cell.

Figure 6:
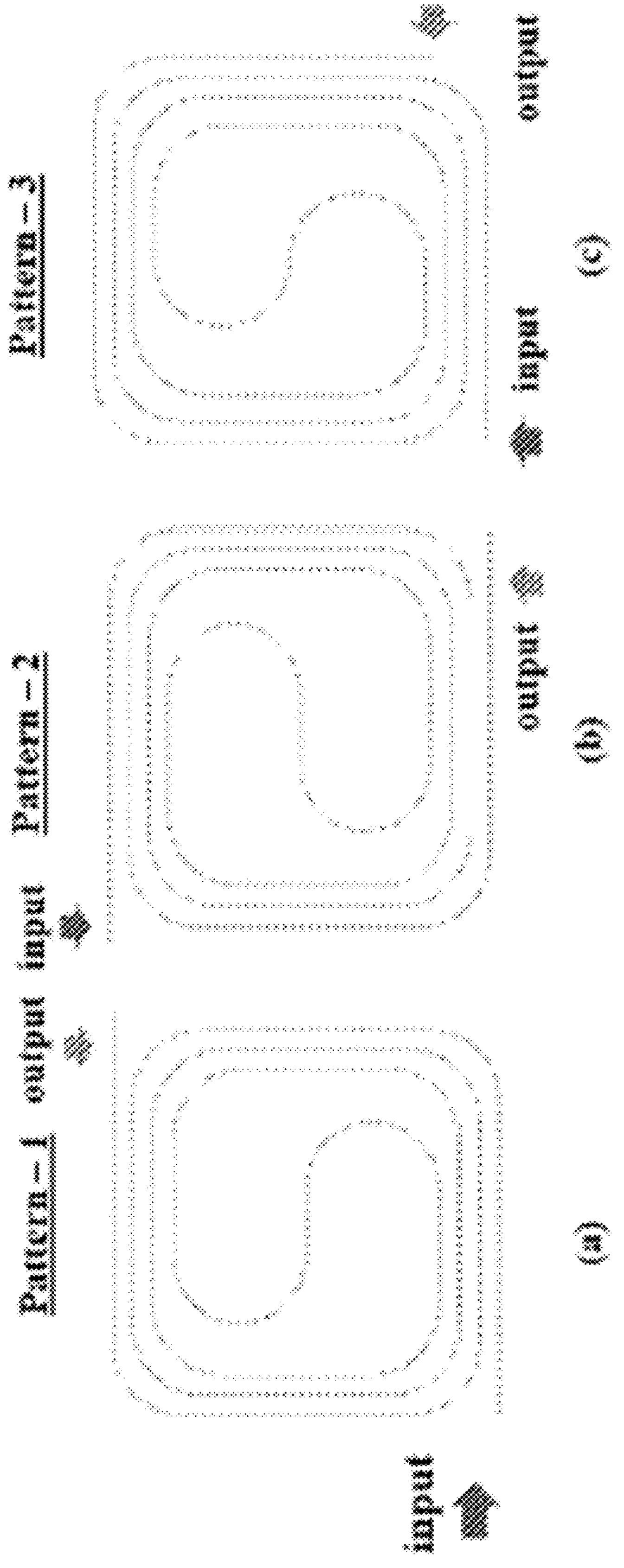
FIG. 6 is a schematic diagram showing illustrative spiral pattern of fiber sensing cell template that is cascadable wherein part A) shows in and out directions; part B) shows complimentary pattern for cascading the cell of A; part C) shows one example of cell patterns at corner for cascading two consecutive rows, in an out directions are perpendicular to each other, according to aspects of the present disclosure.

FIG. 6 is a schematic diagram showing illustrative spiral pattern of fiber sensing cell template that is cascadable wherein part A) shows in and out directions; part B) shows complimentary pattern for cascading the cell of A; part C) shows one example of cell patterns at corner for cascading two consecutive rows, in an out directions are perpendicular to each other, according to aspects of the present disclosure.

With reference to that figure showing illustrative examples of different types of a spiral fiber sensing cell. Significant features of the cell include that there is one input one output for easy cascading and expanding, and there is no over cross of the fiber to avoid fiber damage.

The input output can be the parallel (FIG. 6—part a, FIG. 6—part b) or perpendicular (FIG. 6—part c. FIG. 5—part a, and FIG. 6 part b, is mirror to each other along vertical axis, so that they can be put to consecutive location and joint together easily. The patterns shown in FIG. 6—part c can be used at the edge of the sensing area, where the fiber needs to turn to the next row.

It is challenging to deploy fiber to form such complicated patterns shown above. Instead of directly attaching optical fiber to the floor, we applied puzzle tile of EVA foam, and mill the groove of above pattern on the tiles. In such a way, we create template for accommodating optical fiber.

Figure 7:
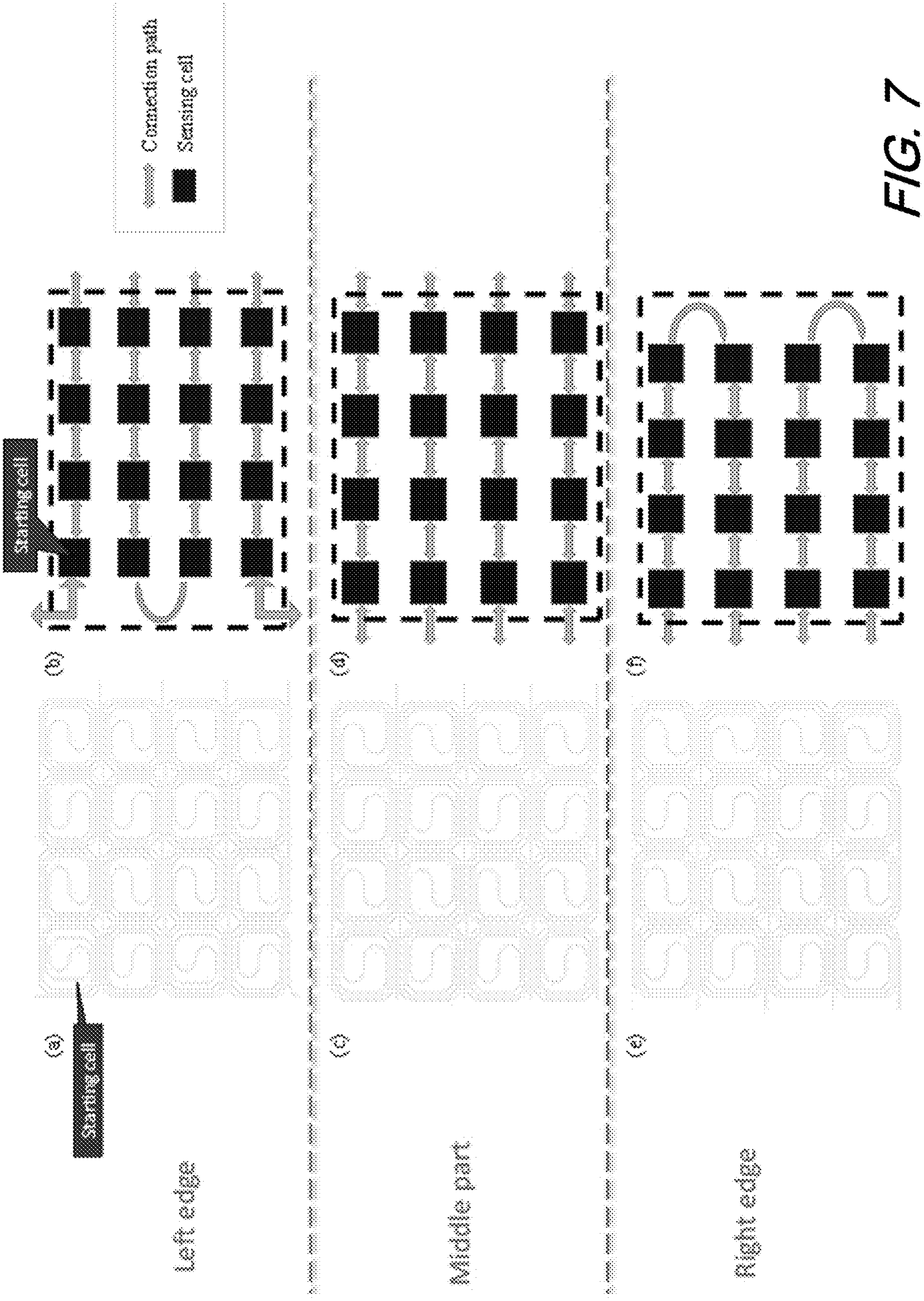
FIG. 7 is a schematic diagram showing illustrative smart tile layout system setup according to aspects of the present disclosure, including illustration sections: (a) Layout of leftmost tile (left-edge tile) of the 2'×2' tile consist of 16 cell patterns with spatial resolution of 6"×6"; (b) the schematic diagram of cascading pattern fiber cell of the left-edge tile; (c) layout of middle tile; (d) cascading pattern of the middle tile; (e) layout of rightmost tile (right-edge tile); (f) cacading pattern of the right-edge tile.

FIG. 7 is a schematic diagram showing illustrative smart tile layout system setup according to aspects of the present disclosure, including illustration sections: (a) Layout of leftmost tile (left-edge tile) of the 2'×2' tile consist of 16 cell patterns with spatial resolution of 6"×6"; (b) the schematic diagram of cascading pattern fiber cell of the left-edge tile; (c) layout of middle tile; (d) cascading pattern of the middle tile; (e) layout of rightmost tile (right-edge tile); (f) cacading pattern of the right-edge tile.

FIG. 7 shows examples of template tile with different patterns. The size of each tile is 2 ft×2 ft and contain 16 sensing cell template. The detail orientation is:

Left edge, FIG. 7 part a, and FIG. 7 part b in which we assume the starting one is from the left corner; One row of the tile is installed from left to the right; Employing Pattern—3 cell in the corners shown in FIG. 6 part c.

Middle part, FIG. 7 part c, and FIG. 7 part d, in which we assume All middle tiles can be used with combinations of Pattern—1 and Pattern—2 shown in FIG. 6 part a, and FIG. 6 part b. and FIG. 6 part b.

Right edge, FIG. 7 part e, and FIG. 7 part fin which we assume The most right template; Employing Pattern—3 cell in the corners shown in FIG. 6 part c; Connecting to the second row start again with template 7 part a and so on.

Figure 8:
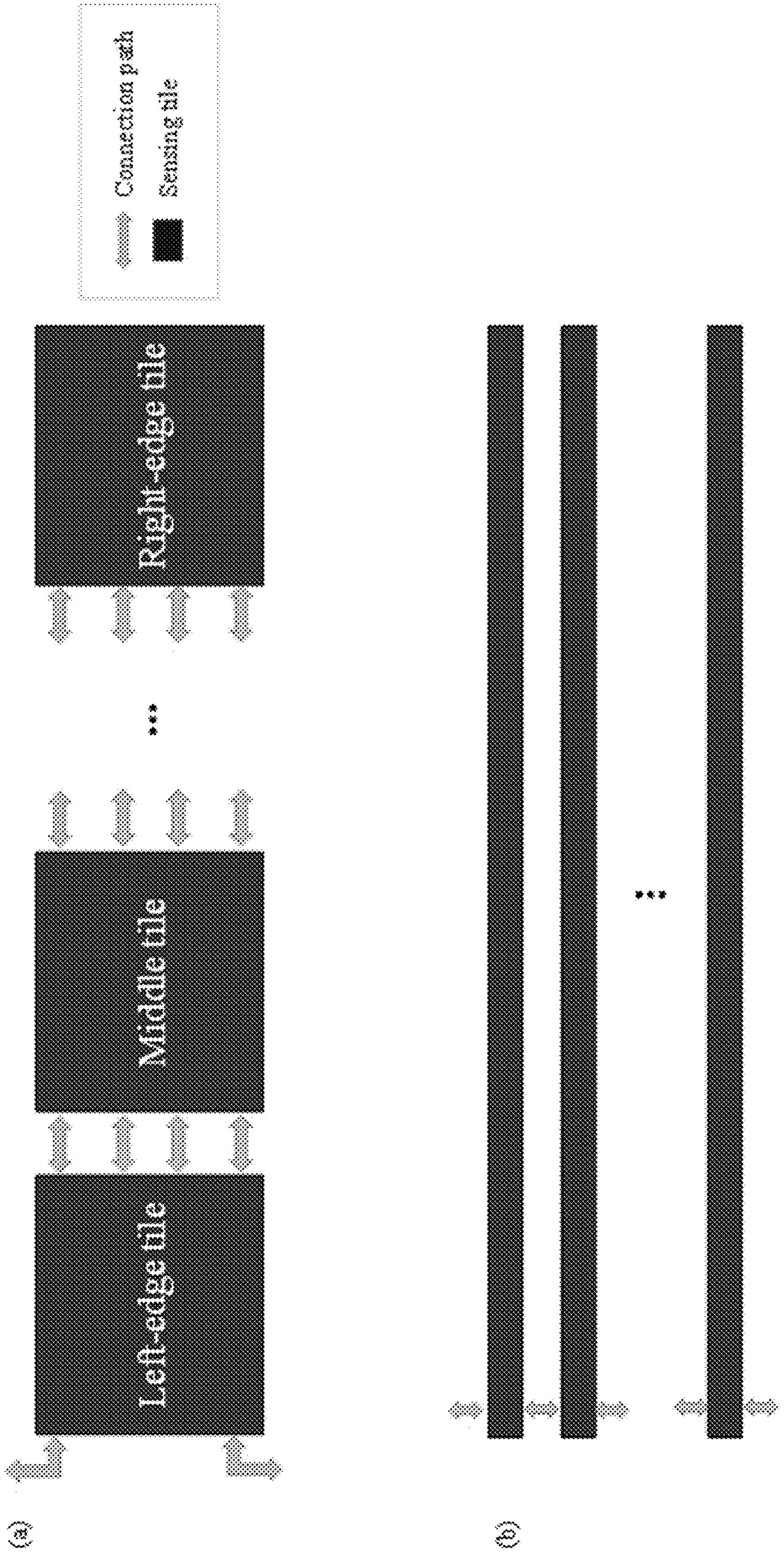
FIG. 8 is a schematic diagram showing illustrative smart floor construction including fiber-based smart-mat according to aspects of the present disclosure including illustration sections: (a) Construction of one row of the sensing tile; and (b) Stack multiple row to form a entire sensing area.

FIG. 8 is a schematic diagram showing illustrative smart floor construction including fiber-based smart-mat according to aspects of the present disclosure including illustration sections: (a) Construction of one row of the sensing tile; and (b) Stack multiple row to form a entire sensing area. After the foam template is laid on the floor, the fiber can be layed to the groove and form the desired pattern. In this way, a rectangle sensing area is formed. This scheme is showed in FIG. 7.

Figure 9:
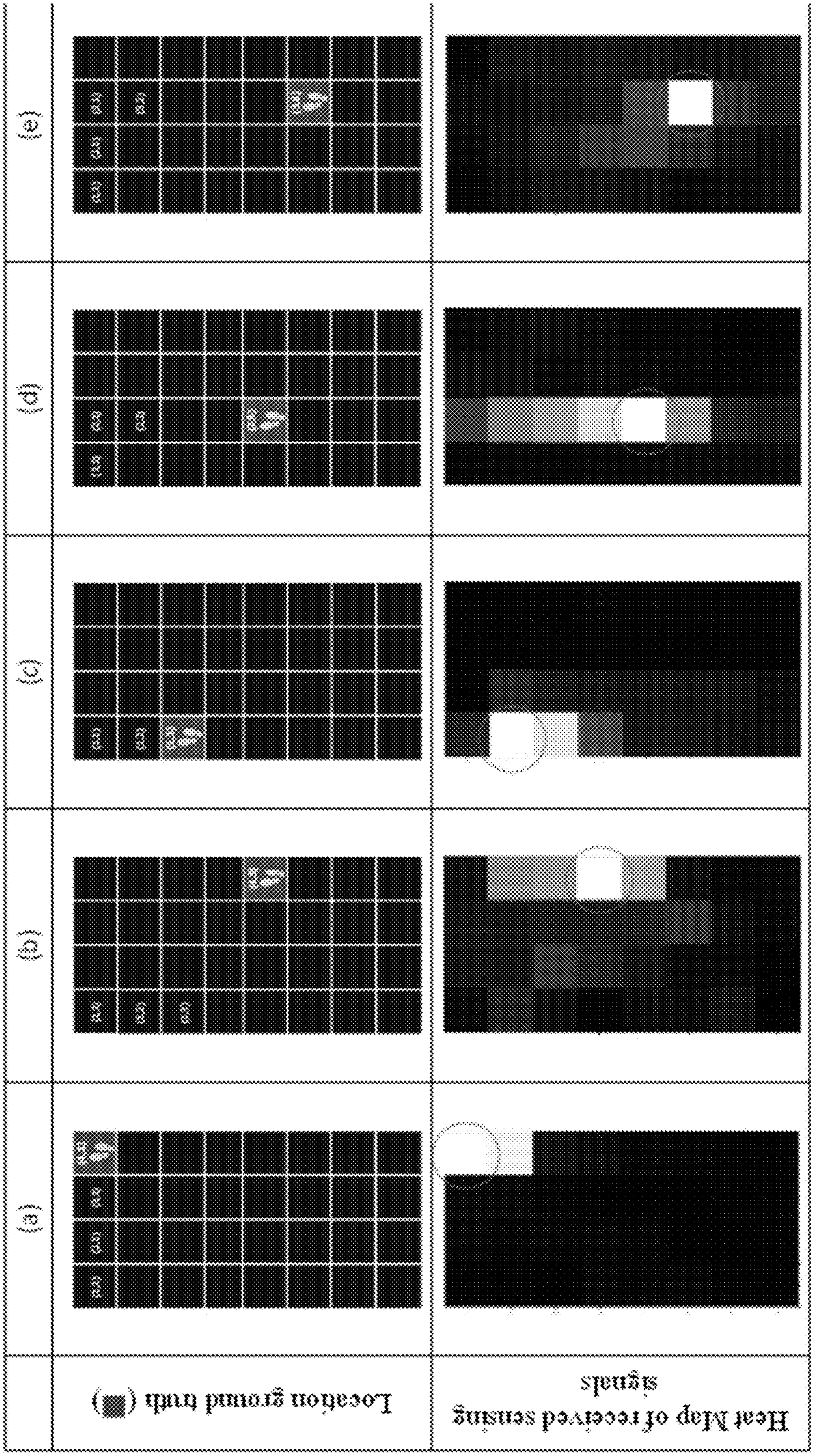
FIG. 9 is a schematic diagram showing illustrative tile of 2'×4' with 32 fiber sensing cell patterns wherein point loading on individual cell (top) vs the heat map of intensity distribution with the region of interest (ROI) (bottom) according to aspects of the present disclosure.
Figure 10:
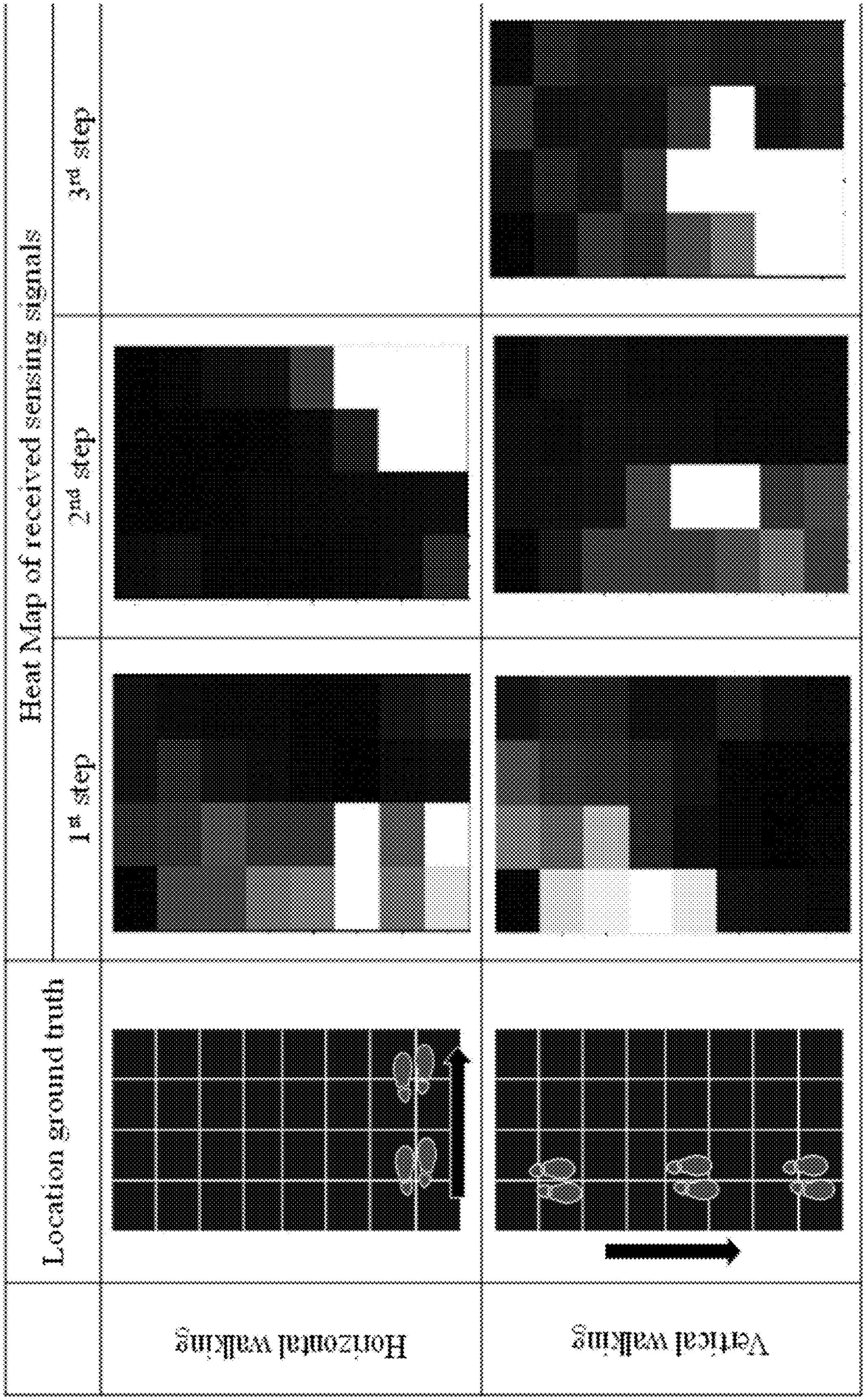
FIG. 10 is a schematic diagram showing illustrative walking test consecutive screen capture of the heat map according to aspects of the present disclosure.

FIG. 9 is a schematic diagram showing illustrative tile of 2'×4' with 32 fiber sensing cell patterns wherein point loading on individual cell (top) vs the heat map of intensity distribution with the region of interest (ROI) (bottom) according to aspects of the present disclosure; and FIG. 10 is a schematic diagram showing illustrative walking test consecutive screen capture of the heat map according to aspects of the present disclosure.

These figures illustrate a preliminary testing results of smart floor in small scale. The size is 2 ft×4 ft with the grid size of 6 in×6 in. FIG. 8 exhibits the static results of rubbing and walking at the same cell. The topper one is the mat with ground truth location of red square while the lower one shows the received sensing signals in a heat map. The heat map represents direct mapping the sensing signals along the fiber to a 2D matrix. The warmer and brighter color denotes higher intensity.

Figure 11:
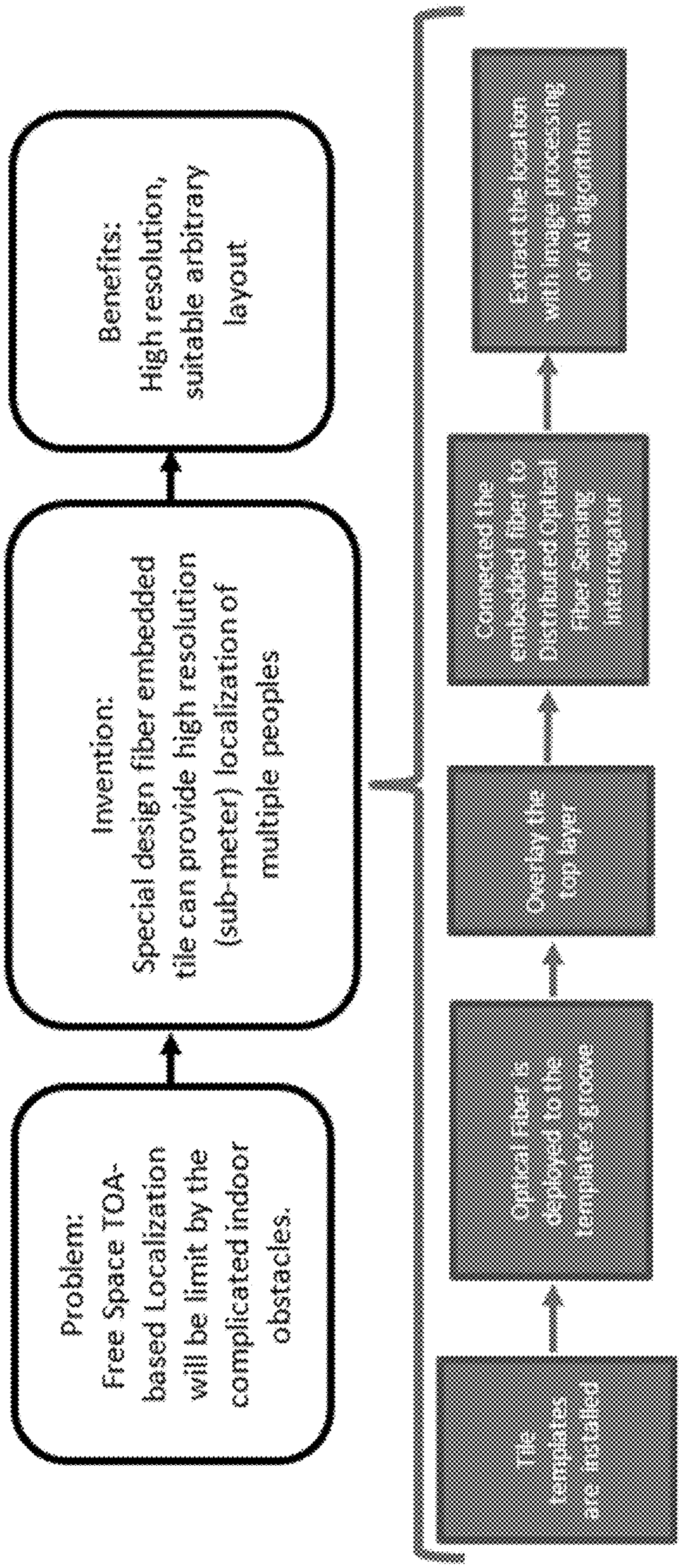
FIG. 11 is a schematic feature diagram showing illustrative features of systems and methods according to aspects of the present disclosure.

FIG. 11 is a schematic feature diagram showing illustrative features of systems and methods according to aspects of the present disclosure.

At this point, while we have presented this disclosure using some specific examples, those skilled in the art will recognize that our teachings are not so limited. Accordingly, this disclosure should be only limited by the scope of the claims attached hereto.

The invention claimed is:

1. An indoor localization system comprising:

a distributed fiber optic sensing system (DFOS) including a length of optical sensor fiber;

an optical interrogator in optical communication with the length of optical sensor fiber, the optical interrogator configured to generate optical pulses from laser light, introduce the optical pulses into the optical sensor fiber and receive backscattered signals from the optical sensor fiber;

an analyzer for analyzing the backscattered signals so received and determining locations along the length of optical sensor fiber experiencing vibrational activity;

a mat comprising a plurality of interlocking puzzle-tile templates, each puzzle-tile template having a series of milled grooves forming a structural template for accommodating the optical sensor fiber;

wherein the length of optical sensor fiber is received within the milled grooves and arranged in a non-overlapped, cascadable spiral pattern;

wherein the non-overlapped, cascadable spiral pattern of each puzzle-tile template includes an optical input and an optical output positioned at peripheral edges of the puzzle-tile template such that the optical output of a first puzzle-tile template is optically coupled to the optical input of an adjacent second puzzle-tile template to form a continuous sensing path;

wherein at least a portion of the length of the optical sensor fiber is located along a floor surface and positioned underneath a top layer of the mat.

2. The system of claim 1 wherein the non-overlapped, cascadable spiral pattern is a pre-determined pattern selected from a group of pre-determined patterns.

3. The system of claim 1 wherein the puzzle-tile templates are constructed from EVA foam, and the milled grooves are sized to receive the optical sensor fiber within a surface of the template.

4. The system of claim 3 wherein the one or more of the milled grooves form a pre-determined pattern.

5. The system of claim 1 wherein the mat is constructed from puzzle tiles with grooves for the optical sensor fiber.

6. The system of claim 5 further comprising a plurality of optical sensor integrated mats, each individual one of the optical sensor integrated mats optically connected to one another to form a continuous optical sensing fiber.

7. The system of claim 1 further comprising an optical switch in optical communication with the optical interrogator, and a plurality of optical sensor fibers, wherein the optical switch is configured to provide optical communication between the optical interrogator and the plurality of optical sensor fibers;

the optical interrogator is configured to generate optical pulses from laser light, introduce the optical pulses into the plurality of optical sensor fibers via the optical switch, and receive backscattered signals from the plurality of optical sensor fibers via the optical switch;

the analyzer Is configured to analyze the backscattered signals so received and determining locations along lengths of the plurality of optical sensor fibers experiencing vibrational activity;

wherein at least a portion of the lengths of the plurality of optical sensor fibers is located along the floor surface and positioned underneath the mat placed on the floor surface; and wherein the length of one or more of the optical sensor fibers is arranged in the non-overlapped, cascadable spiral pattern.

8. The system of claim 1, further comprising a display, wherein the analyzer is configured to generate a 2D visual mapping of the locations of moving persons or objects experiencing vibrational activity over the mat.

9. The system of claim 8, wherein the 2D visual mapping comprises a heat map of the received backscattered signals.

10. The system of claim 1, wherein the analyzer correlates the backscattered signals from the continuous sensing path to an X-Y coordinate grid corresponding to the plurality of interlocking puzzle-tile templates.

* * * * *